United States Patent
Feng et al.

(10) Patent No.: US 8,471,424 B2
(45) Date of Patent: Jun. 25, 2013

(54) PERMANENT-MAGNET (PM) ROTORS AND SYSTEMS

(75) Inventors: Xueqing Feng, Austin, TX (US); Lijun Liu, Hangzhou (CN)

(73) Assignee: Teco-Westinghouse Motor Company, Round Rock, TX (US)

( * ) Notice: Subject to any disclaimer, the term of this patent is extended or adjusted under 35 U.S.C. 154(b) by 518 days.

(21) Appl. No.: 12/512,570

(22) Filed: Jul. 30, 2009

(65) Prior Publication Data

US 2010/0026123 A1 Feb. 4, 2010

(30) Foreign Application Priority Data

Jul. 30, 2008 (CN) .................. 2008 2 0121956 U (51) Int. Cl.
*H02K 1/28* (2006.01)
*H02K 21/02* (2006.01)

(52) U.S. Cl.
USPC ............ 310/156.08; 310/156.12; 310/156.48; 310/156.55

(58) Field of Classification Search
USPC ............. 310/156.12, 156.19, 156.08, 156.55, 310/156.59, 156.48, 156.49, 156.61
See application file for complete search history.

(56) References Cited

U.S. PATENT DOCUMENTS

| | | | |
|---|---|---|---|
| 2,418,980 A | 4/1947 | Morrill | 310/156.76 |
| 3,492,520 A | 1/1970 | Yates | 310/156.79 |
| 3,710,156 A | 1/1973 | Laing | 310/54 |
| 4,060,745 A | 11/1977 | Linscott, Jr. | 310/156.22 |
| 4,127,786 A | 11/1978 | Volkrodt | 310/156.84 |
| 4,139,790 A | 2/1979 | Steen | 310/156.83 |
| 4,139,990 A | 2/1979 | Barnes | 62/5 |
| 4,144,469 A | 3/1979 | Miyashita et al. | 310/156.28 |
| 4,309,635 A | 1/1982 | Sei et al. | 310/211 |
| 4,322,648 A | 3/1982 | Ray et al. | 310/156.55 |
| 4,358,696 A | 11/1982 | Liu et al. | 310/156.56 |
| 4,403,161 A | 9/1983 | Miyashita et al. | 310/156.83 |
| 4,405,873 A | 9/1983 | Nondahl | 310/156.56 |
| 4,454,438 A | 6/1984 | Yamashita et al. | 310/162 |
| 4,486,679 A | 12/1984 | Jones | 310/407 |
| 4,502,752 A | 3/1985 | Montagu | 359/199.1 |
| 4,506,181 A | 3/1985 | Jones et al. | 310/156.78 |
| 4,516,046 A | 5/1985 | Mercier | 310/154.11 |
| 4,559,463 A | 12/1985 | Kobayashi | 310/156.53 |
| 4,568,846 A | 2/1986 | Kapadia | 310/156.83 |
| 4,591,749 A * | 5/1986 | Gauthier et al. | 310/156.19 |
| 4,599,530 A | 7/1986 | Laing | 310/90 |
| 4,620,120 A | 10/1986 | Laing | 310/166 |
| 4,760,300 A | 7/1988 | Yoshida et al. | 310/211 |

(Continued)

FOREIGN PATENT DOCUMENTS

| | | |
|---|---|---|
| CN | 1717853 | 1/2006 |
| DE | 102 54 967 | 6/2004 |

(Continued)

OTHER PUBLICATIONS

Tarimer and Ocak, "Performance comparison of internal and external rotor structured wind generators mounted from same permanent magnets on same geometry," *Electronics and Electrical Engineering*, pp. 65-70, 2009.

*Primary Examiner* — Burton Mullins
(74) *Attorney, Agent, or Firm* — Fulbright & Jaworski LLP (57) ABSTRACT

Permanent-magnet (PM) rotors, rotor components, and machines using PM rotors.

12 Claims, 5 Drawing Sheets

U.S. PATENT DOCUMENTS

| | | | |
|---|---|---|---|
| 4,845,837 A | 7/1989 | Lloyd | 29/598 |
| 4,883,999 A | 11/1989 | Hendershot | 310/216.071 |
| 4,922,152 A | 5/1990 | Gleghorn et al. | 310/156.84 |
| 5,013,951 A | 5/1991 | Stadnik et al. | 310/156.07 |
| 5,097,166 A | 3/1992 | Mikulic | 310/156.83 |
| 5,155,404 A | 10/1992 | Sadarangani | 310/211 |
| 5,159,220 A | 10/1992 | Kliman | 310/156.56 |
| 5,162,685 A * | 11/1992 | Yamaguchi et al. | 310/156.28 |
| 5,220,228 A * | 6/1993 | Sibata | 310/216.093 |
| 5,315,198 A * | 5/1994 | Toroh | 310/162 |
| 5,397,951 A * | 3/1995 | Uchida et al. | 310/156.21 |
| 5,402,026 A | 3/1995 | Gertmar et al. | 310/182 |
| 5,444,319 A | 8/1995 | Nakamura et al. | 310/211 |
| 5,548,172 A | 8/1996 | Kliman et al. | 310/156.53 |
| 5,729,885 A | 3/1998 | Carosa et al. | 29/598 |
| 5,731,647 A | 3/1998 | Schuller et al. | 310/114 |
| 5,818,139 A | 10/1998 | Yamagiwa et al. | 310/156.45 |
| 5,952,757 A | 9/1999 | Boyd, Jr. | 310/156.81 |
| 5,952,764 A | 9/1999 | Nakamura et al. | 310/216.004 |
| 6,088,906 A | 7/2000 | Hsu et al. | 310/211 |
| 6,268,677 B1 | 7/2001 | Takabatake et al. | 310/156.55 |
| 6,548,932 B1 * | 4/2003 | Weiglhofer et al. | 310/156.19 |
| 6,603,232 B2 | 8/2003 | Van Dine et al. | 310/156.01 |
| 6,624,538 B2 | 9/2003 | Janisiewicz et al. | 310/12.25 |
| 6,664,688 B2 | 12/2003 | Naito et al. | 310/156.01 |
| 6,727,624 B2 | 4/2004 | Morita et al. | 310/156.78 |
| 6,727,627 B1 | 4/2004 | Sasaki et al. | 310/211 |
| 6,844,652 B1 | 1/2005 | Chu et al. | 310/216.097 |
| 6,853,106 B2 | 2/2005 | Fujiwara et al. | 310/184 |
| 6,867,527 B2 | 3/2005 | Moore | 310/211 |
| 6,876,119 B2 | 4/2005 | Sasaki et al. | 310/211 |
| 6,891,300 B2 | 5/2005 | Noda et al. | 310/156.78 |
| 6,933,645 B1 * | 8/2005 | Watson | 310/156.09 |
| 6,940,199 B2 | 9/2005 | Imamura et al. | 310/156.48 |
| 7,019,427 B2 | 3/2006 | Sasaki et al. | 310/156.78 |
| 7,030,530 B2 | 4/2006 | Malmberg | 310/156.28 |
| 7,038,345 B2 | 5/2006 | Fratta | 310/156.53 |
| 7,102,259 B2 | 9/2006 | Kawaguchi et al. | 310/61 |
| 7,102,264 B2 | 9/2006 | Yanashima et al. | 310/156.57 |
| 7,183,686 B2 | 2/2007 | Sasaki et al. | 310/156.78 |
| 7,247,965 B2 | 7/2007 | Wihrauch | 310/156.78 |
| 7,365,466 B2 | 4/2008 | Wihrauch et al. | 310/156.78 |
| 7,372,183 B2 | 5/2008 | Sasaki et al. | 310/156.78 |
| 7,466,054 B2 | 12/2008 | Watson et al. | 310/156.08 |
| 7,548,006 B2 | 6/2009 | Yu | 310/156.12 |
| 7,560,842 B2 | 7/2009 | Hattori | 310/156.53 |
| 7,888,835 B2 * | 2/2011 | Yang et al. | 310/156.19 |
| 2003/0080640 A1 | 5/2003 | Weiglhofer et al. | 310/156.12 |
| 2004/0070300 A1* | 4/2004 | Fu | 310/156.47 |
| 2006/0202579 A1* | 9/2006 | Hahn | 310/156.45 |
| 2007/0052313 A1 | 3/2007 | Takahashi et al. | 310/156.53 |
| 2007/0103024 A1 | 5/2007 | Nakayama et al. | 310/156.53 |
| 2007/0138893 A1 | 6/2007 | Son | 310/156.83 |
| 2007/0138894 A1 | 6/2007 | Shin | 310/156.83 |
| 2007/0228858 A1 | 10/2007 | Malmberg | 310/156.01 |
| 2008/0048517 A1* | 2/2008 | Ochiai et al. | 310/218 |
| 2008/0093944 A1 | 4/2008 | Takahashi et al. | 310/156.02 |
| 2008/0197737 A1 | 8/2008 | Poulin et al. | 310/156.08 |
| 2008/0258573 A1 | 10/2008 | Kamiya | 310/156.02 |
| 2008/0265706 A1 | 10/2008 | Nakayama et al. | 310/156.53 |
| 2008/0272667 A1 | 11/2008 | Ionel et al. | 310/156.83 |
| 2009/0091200 A1 | 4/2009 | Weihrauch | 310/61 |
| 2009/0115280 A1 | 5/2009 | Nakayama et al. | 310/156.53 |
| 2009/0140593 A1 | 6/2009 | Kaiser et al. | 310/156.53 |

FOREIGN PATENT DOCUMENTS

| | | |
|---|---|---|
| DE | 103 57 230 | 3/2005 |
| EP | 0549430 | * 12/1992 |
| JP | 2001 025189 | 1/2001 |
| WO | WO 2007/025180 | 3/2007 |
| WO | WO 2007/073086 | 6/2007 |

* cited by examiner

PERMANENT-MAGNET (PM) ROTORS AND SYSTEMS

RELATED APPLICATIONS

This application claims benefit under 35 U.S.C. §119(a) to Chinese utility model registration No. 200820121956.7, filed on Jul. 30, 2008, which is incorporated by reference.

BACKGROUND

1. Field of the Invention

The present invention relates generally to rotors and electrical machines using rotors, and, more particularly, but not by way of limitation, to permanent-magnet (PM) rotors, rotor components, and machines comprising PM rotors.

2. Description of Related Art

Rotors and machines using rotors have been known in the art for some time. For example, electrical machines such as motors traditionally include brushes and a rotor with wire windings. Such traditional winding-based rotors are relatively inefficient compared with PM rotors, and PM rotors may generally be made smaller than traditional winding-based rotors for a given capacity or output. As a result, machines using PM rotors may generally be made smaller than those with traditional winding-based rotors. PM rotors generally use permanent magnet material instead of traditional electrical wire windings, such that a PM rotor machine does not require reactive current from a power supply. As such, power consumption of PM machines can generally be reduced relative to those using traditional winding-based rotors for a given output. For example, some PM rotor machines can achieve a higher power factor, higher power density, and higher efficiency (e.g., 25% to 120% of the rated load), relative to a traditional winding-based machine. Maintenance costs of PM machines may also be reduced, as the simpler configuration (e.g., without windings, brushes, etc.) may result in fewer parts or points of potential failure.

In some known PM rotor configurations, thin, arcuate PM bulks are mounted to an exterior surface of a rotor core. For example, PM bulks have been glued onto an exterior surface of a rotor core and a non-magnetic ring has been disposed (e.g., glued) around the PM bulks. In this example, there is generally not enough space or insulation between poles (N pole, S pole) of adjacent PM bulks such that flux leakage between poles may be high. This flux leakage may result in relatively poor performance. In another example, the outer surface of a rotor core has been grooved and PM bulks have been disposed in grooves with a non-magnetic ring disposed around the PM bulks. In this example, there is generally magnetic material between the poles (N and S poles) of adjacent PM bulks, often resulting in high flux leakage. Additionally, in this configuration, the d- and q-axis inductances are not symmetrical and complex control configuration is generally needed. In a third example, PM bulks have been attached to the outer surface of a rotor core with radially oriented screws extending through at least a portion of the PM bulks and into the rotor core. In this third example, especially for large or high-speed machines, the centrifugal force in the screws may be enough to loosen the radially oriented screws and undermine the structural integrity of the rotor.

SUMMARY OF THE INVENTION

The present disclosure includes various embodiments of PM rotors, rotor components, and machines comprising PM rotors.

Some embodiments of the present permanent-magnet (PM) rotor comprise: a rotor core having an axis of rotation; and a plurality of PM bulks coupled to the rotor core; where the rotor is configured such that the wave-induced voltage curve of the rotor is substantially sinusoidal.

Some embodiments of the present permanent-magnet (PM) rotor comprise: a rotor core having an axis of rotation and an outer surface, the outer surface having a first radius of curvature extending between the axis of rotation and the outer surface; and a plurality of PM bulks each having an outer surface, and an inner surface, the inner surface having an inner radius of curvature substantially equal to the first radius of curvature of the rotor core, and the outer surface having an outer radius of curvature that is smaller than the first radius of curvature; where the plurality of PM bulks are coupled to the rotor core such that the inner surface of each PM bulk is adjacent to the outer surface of the rotor core.

Any embodiment of any of the present methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a device or system that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a rotor that comprises a rotor core having an axis of rotation; and a plurality of PM bulks coupled to the rotor core; where the rotor is configured such that the wave-induced voltage curve of the rotor is substantially sinusoidal, the rotor includes the specified elements but is not limited to having only those elements. For example, such a rotor could also include clamps that couple the PM bulks to the rotor core.

Further, a device or structure that is configured in a certain way is configured in at least that way, but it can also be configured in other ways than those specifically described.

Figure 1A:
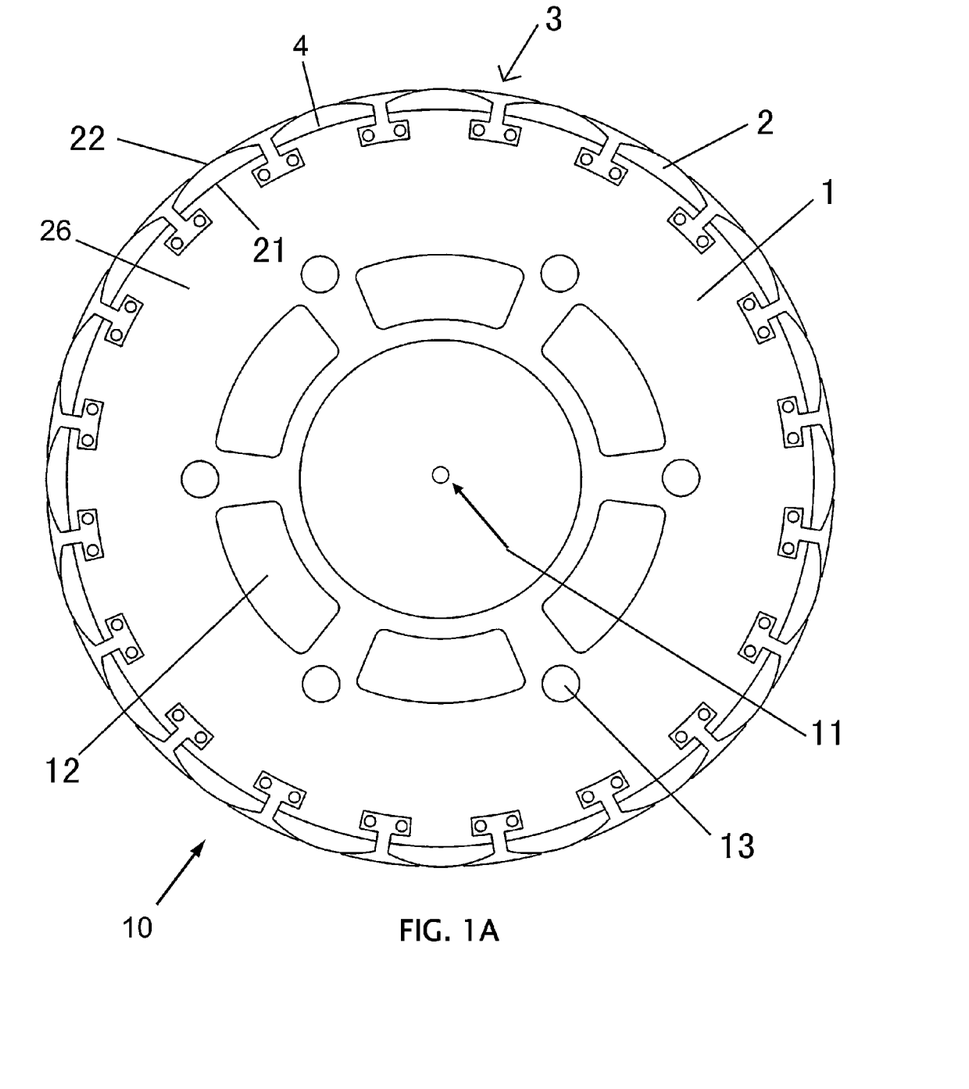
FIGS. 1A and 1B depict two side views of one embodiment of one of the present PM rotors.
Figure 1B:
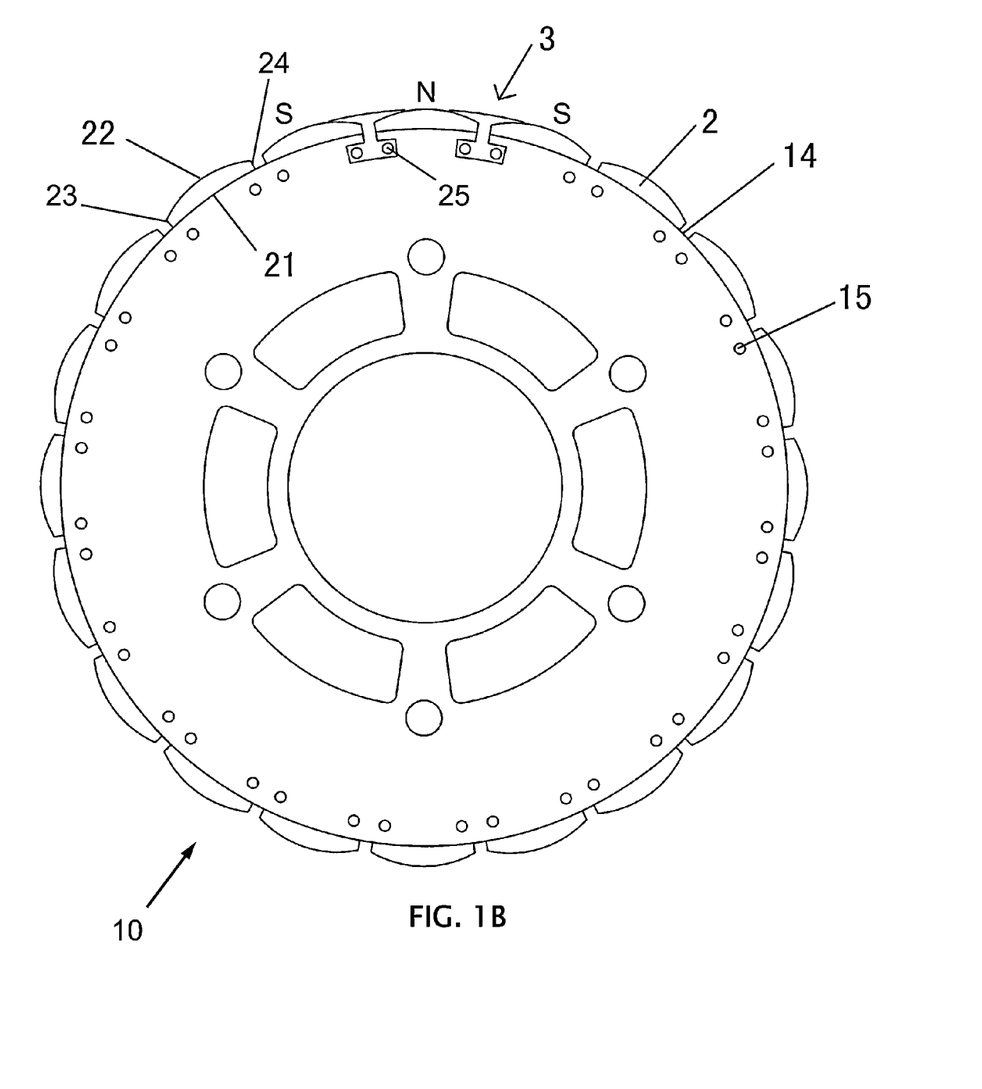

Referring now to the drawings, and more particularly to FIGS. 1A and 1B, shown therein and designated by the reference numeral 10 is an embodiment of one of the present permanent-magnet (PM) rotors. PM rotor 10 may be interchangeably referred to in this disclosure as rotor 10. FIG. 1A depicts an assembled rotor 10, and FIG. 1B depicts a partially disassembled rotor 10. PM rotor 10 comprises a rotor core 1, and a plurality of PM bulks 2. Rotor core 1 has an axis of rotation 11 at its center (extending perpendicular through the rotor and indicated by a relatively larger circle for clarity). Rotor 10 need not actually rotate to define axis of rotation 11. Rather, axis of rotation 11 is the axis about which rotor 10 would rotate if put into operation (e.g., in an electrical motor or other machine). Rotor core 1 also has an outer surface 4 having a first radius of curvature extending between axis of rotation 11 and outer surface 4. In the embodiment shown, outer surface 4 is substantially circular (and, more particularly, is circular), but in other embodiments, outer surface 4 need not be substantially circular (e.g., need not be substantially arcuate all the way around axis of rotation 11). PM bulks 2 each have an outer surface 22 and an inner surface 21. Inner surface 21 has an inner radius of curvature that is substantially equal (and, in the depicted embodiment, is equal) to the first radius of curvature of rotor core 1 (of outer surface 4 of rotor core 1). Outer surface 22 has an outer radius of curvature that is smaller than the first radius of curvature (of outer surface 4 of rotor core 1). In the embodiment shown, the plurality of PM bulks are coupled to rotor core 1 such that inner surface 22 of each PM bulk 2 is adjacent to outer surface 4 of rotor core 1.

Rotor core 1 can comprise any suitable material, such as, for example, metal, steel, stainless steel, aluminum, carbon fiber, alloys, composites, and/or any other suitably durable and/or suitably rigid materials. PM bulks 2 can comprise any suitable PM material, such as, for example, NdFeB. NdFeB, for example, has a high magnetic energy, large remanence in the Bromine (Br,), large coercive force $H_c$, and working temperature can reach 180° C. As such, with NdFeB, less magnet material can be used to get enough magnetic energy, and the size of the machine can be reduced to achieve a machine with high energy density, as compared to certain other conventional materials.

In the embodiment shown, PM bulks 2 each have a first end 23 and a second end 24. Additionally, outer surface 22 extends between first end 23 and second end 24 (e.g., outer surface 22 has a continuously arcuate profile that extends between the first and second ends), and inner surface 21 extends between first end 23 and second end 24 (e.g., inner surface 21 has a continuously arcuate profile that extends between the first and second ends). In the embodiment shown, PM bulks 2 are coupled around axis of rotation 11 of rotor core 1 at equiangular intervals. For example, in the embodiment shown, rotor 10 comprises twenty PM bulks 2 such that the PM bulks are at substantially equal eighteen degree angular intervals.

In the embodiment shown, rotor 10 further comprises a plurality of clamps 3 coupled to rotor core 1 such that each clamp 3 is disposed between two adjacent PM bulks 1. In the embodiment shown, clamps 3 comprise a non-magnetic and electrically conductive material such as nonmagnetic stainless steel. In this way, and as illustrated by the N and S designations in FIG. 2B, clamps 3 each reduce flux leakage by magnetically insulating the N pole of one of one of the two adjacent PM bulks from the S pole of the other of the two adjacent PM bulks. Additionally, the electrical conductivity of clamps 3 can create a closed conductive loop around PM bulks 2 that includes the clamps and the rotor core to help reduce and/or avoid PM bulks from demagnetizing. In other embodiments, clamps 3 can comprise any suitable material. For example, in some embodiments, clamps 3 can comprise a magnet material. In embodiments in which clamps 3 comprise magnetic material, clamps 3 each magnetically couple the N pole of one of one of the two adjacent PM bulks to the S pole of the other of the two PM bulks.

In the embodiment shown, clamps 3 are coupled to the rotor by fasteners 25 extending through a portion of the clamp into a lateral side 26 of rotor core 1. Fasteners 25 can comprise any suitable fasteners, such as, for example, screws, rivets, pins, welds, or the like. In some embodiments, fasteners 25 each have a longitudinal axis that is not perpendicular to axis of rotation 11 of the rotor core. In the embodiment shown, fasteners 25 are parallel (have a longitudinal axis that is parallel) to axis of rotation 11 of the rotor core. In this way, PM bulks 2 are coupled to rotor core 1 without fasteners extending into or through the PM bulk. More particularly, in this way, a given clamp 3 may be characterized as being configured to resist the centrifugal force tending to separate a given PM bulk from the rotor core during operation of the rotor. In some embodiments, PM bulks 2 are coupled to rotor core 1 independently of any adhesive. In the embodiment shown, PM bulks 2 are coupled to rotor core 1 independently of any adhesive (e.g., any adhesive used or present in rotor 10 does not contribute more than a nominal amount to coupling the PM bulks to the rotor core). In the embodiment shown, PM bulks 2 are coupled to rotor core 1 independently of any grooves in outer surface 4 of rotor core 1 (e.g., any grooves present in outer surface 4 of rotor core 1 do not contribute to coupling the PM bulks to the rotor core). In the embodiment shown, PM bulks 2 are coupled to rotor core 1 independently of any radially oriented fasteners extending into rotor core 1 (e.g., any radially oriented fasteners extending into the rotor core do not contribute to coupling the PM bulks to the rotor core).

Figure 2A:
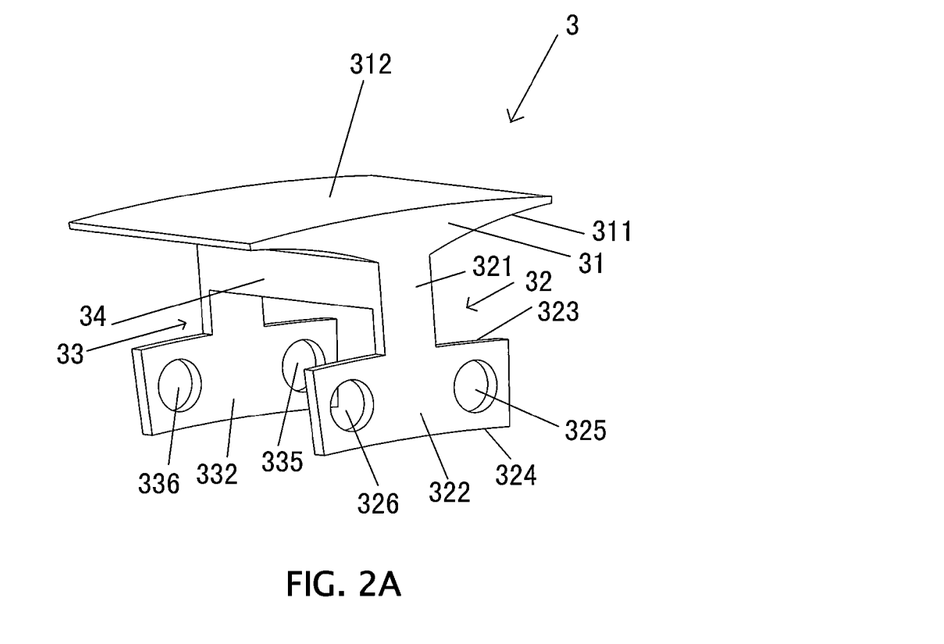
FIGS. 2A and 2B depict two views of one embodiment of one of the present clamps of the PM rotor of FIGS. 1A and 1B.
Figure 2B:
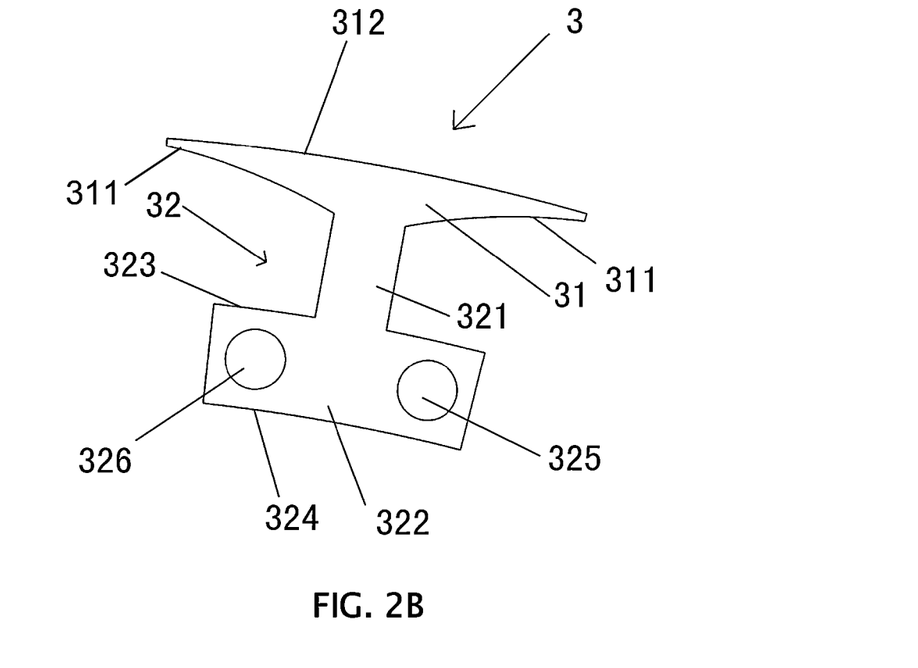

As shown in FIGS. 2A and 2B, in the embodiment shown, clamps 3 each have a clamping portion 31 with an outer surface 312 and two inner clamping surfaces 311. Inner clamping surfaces 311 each has a radius of curvature substantially equal to the outer radius of curvature of PM bulks 2 (the radius of curvature of outer surface 22 of the PM bulks) such that there is substantially no gap between clamping surface 311 and outer surface 22. This configuration of PM bulk shape and clamp shape can reduce and/or eliminate the airgap between the clamps and PM bulks, thereby reducing harmonics of flux density in phase windings, and aerodynamic effects of an airgap, thereby reducing electromagnetic noise and vibration, losses, and harmful torque caused by harmonics in airgaps.

In some embodiments, inner clamping surface 311 need not be a continuous surface (e.g., can comprise two or more clamping edges). Outer surface 312 has an outer radius of curvature. In the embodiment shown, the radius of curvature of outer surface 312 is larger than the first radius of curvature of outer surface 4 of rotor core 1. When clamps 3 are coupled to rotor core 1 as shown in FIG. 1, outer surface 312 of each clamp is concentrically disposed about axis of rotation 11 of rotor core 1. Stated another way, when clamps 3 are coupled to rotor core 1 as shown in FIG. 1, the radius of curvature of outer surface 312 extends between axis of rotation 11 and outer surface 312. In this way, outer surfaces 312 of clamps 3 and outer surfaces 21 of PM bulks 2 cooperate to define an outer perimeter of rotor 10 that is substantially circular (e.g., no portion of the outer perimeter departs from the smallest circle circumscribing rotor 10 by more than 1, 2, 3, 4, and/or 5 percent of the radius of the smallest circle circumscribing rotor 10). In this way, harmonic properties of rotor 10 are improved relative to previously known PM rotor configurations, such that rotor 10 can withstand use at higher rotational speeds.

In the embodiment shown, clamps 3 each comprise an attachment portion 32 configured such that if the clamp is coupled to the rotor core as shown in FIG. 1, attachment portion 34 extends inward toward axis of rotation 11 of rotor core 1 and can be coupled to the rotor core. In the embodiment shown, attachment portion 34 includes two mirror-image attachment portions 32, 33 spaced apart from one another (FIG. 2A) such that if the clamp is coupled to the rotor core, attachment members are disposed on opposite lateral sides of the rotor core. In the embodiment shown, each attachment portion 32, 33 includes an attachment member 321. In the embodiment shown, each attachment member 321 includes a flange or base 322, 332 that has an inner edge 324 having a radius of curvature, and an outer edge 323 having a radius of curvature. When clamps 3 are coupled to the rotor core, inner edge 324 and outer edge 323 are concentrically disposed around axis of rotation 11 of the rotor core. In the embodiment shown, each attachment base 322, 332 also includes two holes 325, 326 or 335, 336 through which fasteners 25 can be passed into the rotor core to couple clamp 3 to the rotor core. In the embodiment shown, holes 325, 326 have the same diameter and axial direction as holes 335, 336.

In the embodiment shown, rotor 10 can also be described as comprising: a rotor core 1 having an axis of rotation 11; and a plurality of PM bulks 2 coupled to rotor core 1; where rotor 1 is configured such that the wave-induced voltage curve (e.g., the waveform of the curve) of the rotor is substantially sinusoidal (e.g., under load). In particular, and as best shown in FIG. 3C, a substantially sinusoidal wave-induced voltage curve 400 of rotor 10 is shown relative to a fundamental (ideal) induced phase voltage curve 402. As shown, curve 400 has periodic maxima 404 and periodic minima 406, each having a peak absolute deviation from a median 408. Additionally, in the embodiment shown, each periodic maximum 404 does not have a local minimum that deviates from the periodic maximum by more than ten percent of the peak absolute deviation of the periodic maximum, and each periodic minimum 406 does not have a local maximum that deviates from the periodic minimum by more than ten percent of the peak absolute deviation of the periodic minimum. For example, if a periodic maximum 404 has a maximum deviation of 2.5 units, then the periodic maximum does not have a local minimum that deviates from the maximum deviation by more than 2.25 units (e.g., any local minima do not dip below a 2.25 unit upward deviation from median 408). As shown, curve 400 is largely free of potentially harmful harmonic patterns, such that electromagnetic noise and vibration, losses and harmful torque caused by harmonics can be reduced, while machine efficiency, temperature rise, control performance, and output power can be increased or improved.

Figure 3A:
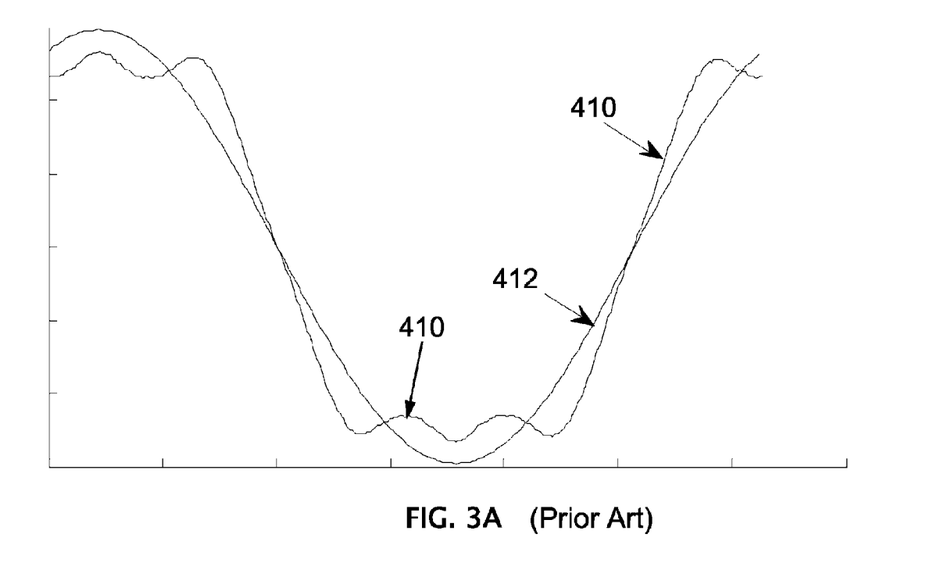
FIGS. 3A, 3B, and 3C depict wave-induced voltage curves for two prior-art rotors and for the PM rotor of FIGS. 1A and 1B.
Figure 3B:
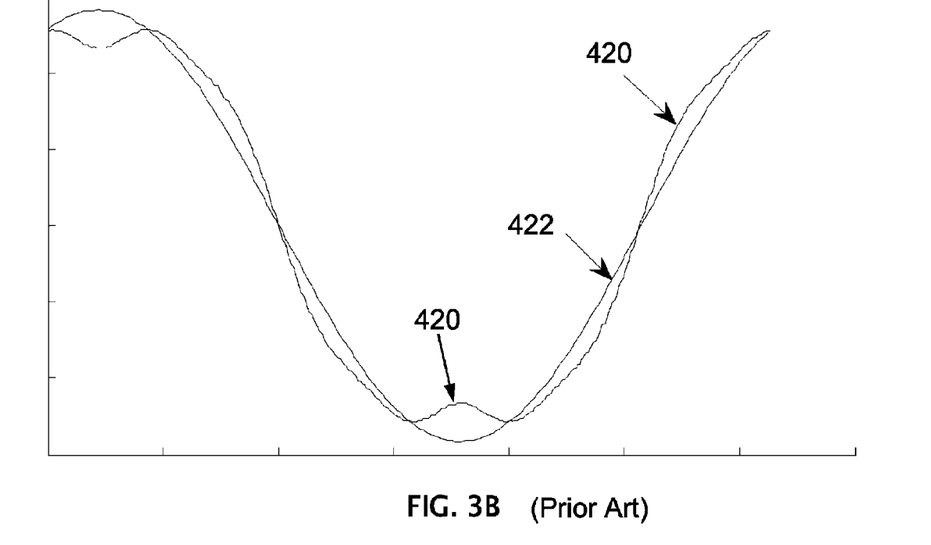
Figure 3C:
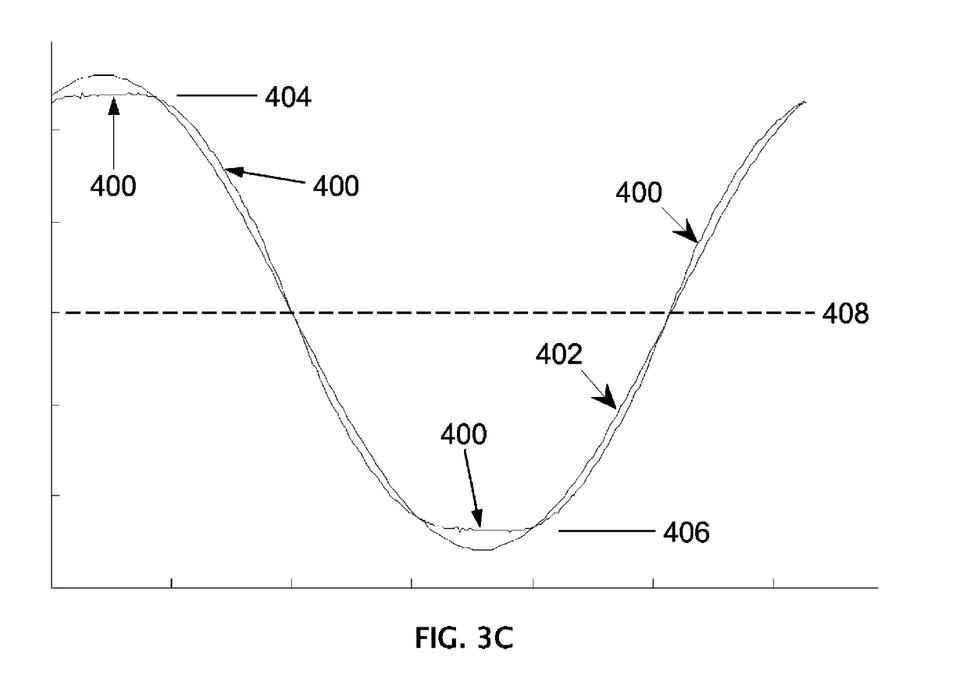

For comparison, FIGS. 3A and 3B depicts wave-induced voltage curves of two other configurations of rotors. FIG. 3A depicts a wave-induced voltage curve 410 of a traditional winding-based rotor relative to a fundamental (ideal) induced phase voltage curve 412. As shown, curve 410 contains harmful harmonic patterns, and substantially deviates from a sinusoidal profile. FIG. 3B depicts a wave-induced voltage curve 420 of a previously known PM rotor, with PM bulks glued or clamped to a rotor core with a non-magnetic ring encircling the PM bulks, relative to a fundamental (ideal) induced phase voltage curve 422. As shown, curve 420 also contains harmful harmonic patterns, and substantially deviates from a sinusoidal profile.

The configuration of rotor 10 has a number of advantages over previously known rotor configurations. Specifically, the PM bulks can be fixed firmly onto the outer surface of the rotor core, such that rotor 10 can be used for high- or super-high speed PM machine applications. Additionally, the unique clamps and/or the unique PM bulks of this disclosure permit the reduction of flux leakage, the reduction of PM material required for a given output, increased sinusoidal airgap flux density, and reduced harmonics. The present configuration also resists or reduces demagnetization of the PM bulks. Ultimately, electromagnetic noise and vibration, losses and harmful torque caused by harmonics can be reduced, while machine efficiency, temperature rise, control performance, and output power can be improved.

Various embodiments of the present PM-rotor machines can comprise various embodiments of the present PM rotors. Examples of PM-rotor machines include motors, generators, synchronous motors and/or generators, and the like.

The various illustrative embodiments of rotors and machines described herein are not intended to be limited to the particular forms disclosed. Rather, they include all modifications, equivalents, and alternatives falling within the scope of the claims.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A permanent-magnet (PM) rotor comprising:
   a rotor core having an axis of rotation and an outer surface, the outer surface having a first radius of curvature extending between the axis of rotation and the outer surface; and
   a plurality of PM bulks each having an outer surface, and an inner surface, the inner surface having an inner radius of curvature substantially equal to the first radius of curvature of the rotor core, and the outer surface having an outer radius of curvature that is smaller than the first radius of curvature;
   a plurality of clamps each having a clamping portion with an outer surface and two inner clamping surfaces, the inner clamping surfaces each having a radius of curvature substantially equal to the outer radius of curvature of the PM bulks, and the outer surface having an outer radius of curvature;
   where the plurality of clamps are coupled to the rotor core such that each clamp is disposed between two adjacent PM bulks and such that the outer surface of each of the plurality of clamps is concentrically disposed about the axis of rotation of the rotor core;
   where the plurality of PM bulks are coupled to the rotor core such that the inner surface of each PM bulk is adjacent to the outer surface of the rotor core;

where the plurality of PM bulks are coupled around the axis of rotation of the rotor core at equiangular intervals; and where the outer radius of curvature of the clamps is greater than the first radius of curvature of the rotor core.

2. The rotor of claim 1, where each of the plurality of clamps comprises an attachment portion extending inward toward the axis of rotation of the rotor core and coupled to the rotor core.

3. The rotor of claim 1, where each PM bulk has a first end and a second end, the outer surface extends between the first end and the second end, and the inner surface extends between the first end and the second end.

4. The rotor of claim 1, where the PM bulks are coupled to the rotor core without fasteners extending into or through the PM bulk.

5. The rotor of claim 1, where the PM bulks are coupled to the rotor core independently of any adhesive, independently of any grooves in the outer surface of the rotor core, and independently of any radially oriented fasteners extending into the rotor core.

6. The rotor of claim 1, where the rotor is configured such that the wave-induced voltage curve of the rotor is substantially sinusoidal.

7. A permanent-magnet (PM) rotor comprising:
 a rotor core having an axis of rotation and an outer surface, the outer surface having a first radius of curvature extending between the axis of rotation and the outer surface; and
 a plurality of PM bulks each having an outer surface, and an inner surface, the inner surface having an inner radius of curvature substantially equal to the first radius of curvature of the rotor core, and the outer surface having an outer radius of curvature that is smaller than the first radius of curvature;
 a plurality of clamps each having a clamping portion with an outer surface and two inner clamping surfaces, the inner clamping surfaces each having a radius of curvature substantially equal to the outer radius of curvature of the PM bulks, and the outer surface having an outer radius of curvature;
 where the plurality of clamps are coupled to the rotor core such that each clamp is disposed between two adjacent PM bulks and such that the outer surface of each of the plurality of clamps is concentrically disposed about the axis of rotation of the rotor core;
 where the plurality of PM bulks are coupled to the rotor core such that the inner surface of each PM bulk is adjacent to the outer surface of the rotor core;
 where the plurality of PM bulks are coupled around the axis of rotation of the rotor core at equiangular intervals;
 where each of the plurality of clamps comprises an attachment portion extending inward toward the axis of rotation of the rotor core and coupled to the rotor core; and
 where the attachment portion of each clamp comprises a pair of attachment members spaced apart from one another and disposed on opposite lateral sides of the rotor core.

8. The rotor of claim 7, where each attachment member is coupled to the rotor core by one or more fasteners each having a longitudinal axis that is not perpendicular to the axis of rotation of the rotor core.

9. The rotor of claim 7, where each PM bulk has a first end and a second end, the outer surface extends between the first end and the second end, and the inner surface extends between the first end and the second end.

10. The rotor of claim 7, where the PM bulks are coupled to the rotor core without fasteners extending into or through the PM bulk.

11. The rotor of claim 7, where the PM bulks are coupled to the rotor core independently of any adhesive, independently of any grooves in the outer surface of the rotor core, and independently of any radially oriented fasteners extending into the rotor core.

12. The rotor of claim 7, where the rotor is configured such that the wave-induced voltage curve of the rotor is substantially sinusoidal.

\* \* \* \* \*